Aug. 12, 1924.　　　　　　　　　　　　　　　　1,504,422
J. W. BISHOP
MOLDING DIE
Filed Feb. 23, 1924

Inventor:
Joseph W. Bishop
By Wm. O. Belt Atty.

Patented Aug. 12, 1924.

1,504,422

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF WILMINGTON, DELAWARE, A CORPORATION OF DELAWARE.

MOLDING DIE.

Application filed February 23, 1924. Serial No. 694,647.

*To all whom it may concern:*

Be it known that I, JOSEPH W. BISHOP, a citizen of the United States, residing at Muskegon, in the county of Muskegon and State of Michigan, have invented certain new and useful Improvements in Molding Dies, of which the following is a specification.

This invention relates to improvements in molding dies of that class which are provided with channels or passages for the circulation of steam and water in the heating and cooling steps of the molding operation.

Heretofore molding dies have been provided with partitions so constructed and arranged that the steam and water are caused to flow in a tortuous passage provided in some cases by a plurality of concentric channels so connected that the steam or water will travel in a forward direction in one channel and then pass on to the next channel and travel in a reverse direction therein, and to the next channel and pass in a forward direction therein, and so on. To produce this tortuous passage, it has been customary to leave ends of the partitions forming the concentric channels unsupported, and it has been found that these unsupported ends are liable to break down under the tremendous pressure which is employed, for example, in the manufacture of phonograph records. These tortuous passages provide pockets or dead corners where residue accumulates and finally interferes with the proper circulation. Furthermore, it is a comparatively expensive and somewhat difficult matter to make a die with such a tortuous passage as I have indicated.

My invention has for its object to simplify and improve the construction of molding dies for the manufacture of phonograph records and such other things for which it may be adapted, to reduce the cost of manufacturing the dies, to improve the circulation by the elimination of corners and dead ends where the residue may accumulate, and to support and protect the ends of the partitions forming the channels of the passage so that they will withstand heavy pressure employed in using the dies without breaking down.

In the accompanying drawings illustrating my invention—

Figure 1:
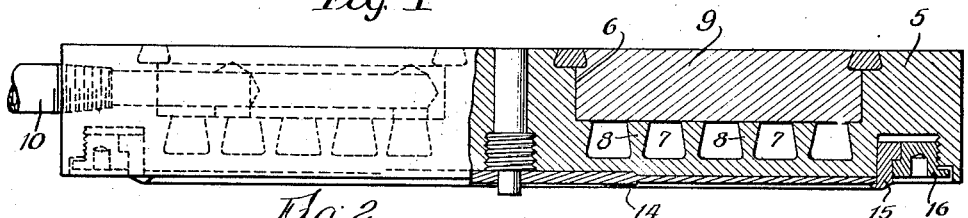
Fig. 1 is an edge view partly in section of a die for making a phonograph record and embodying my invention.
Figure 2:
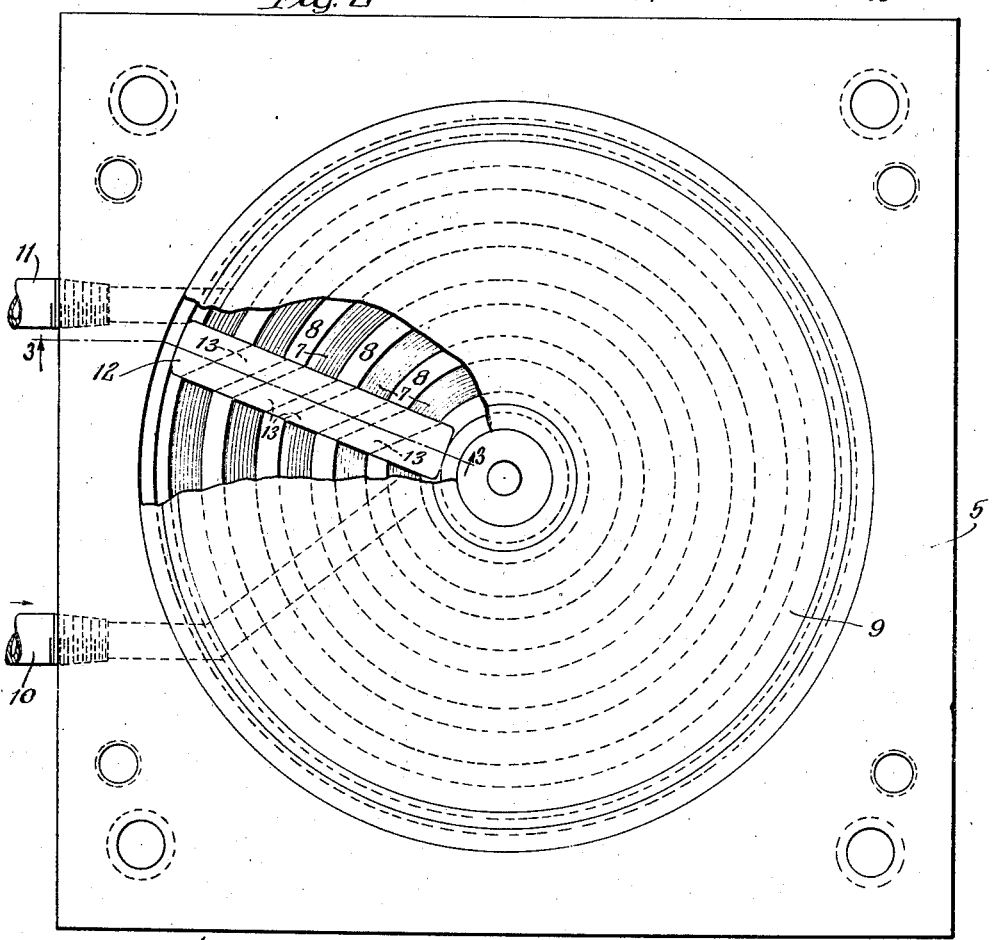
Fig. 2 is a plan view partly broken away.

In the drawings I have shown the upper die for use in a hydraulic press for making phonograph records, and it will be understood that the invention may be embedded in a corresponding manner in the lower die of the press and in dies for other presses, or for making other things, this being a simple and familiar embodiment of the invention which will be readily understood.

Figure 3:
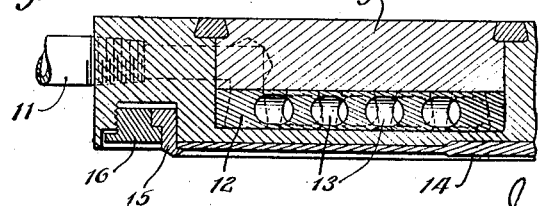
Fig. 3 is a sectional view on the line 3—3 of Fig. 2.

The die 5 is provided with an annular recess 6 at the bottom of which is a plurality of concentric channels 7 formed by intermediate partitions 8. A back plate or cover plate 9 is secured in the recess 6 and forms one wall of the channels. An inlet 10 communicates with the inner channel so that steam or water may be introduced to the die at or about the center thereof to gradually spread out to the periphery where it escapes through the pipe 11. The partitions are concentrically arranged and a radial groove is cut through the partitions to receive a plug 12 which is rigidly secured in the die below the back or cover plate (Fig. 3). Diagonal channels 13 are arranged in the plug to connect the end of the inner channel at one side of the plug with the beginning of the next channel at the other side of the plug, and to connect the end of the second channel on one side of the plug with the beginning of the third channel on the other side of the plug, and so on, so that the concentric channels 7 and the diagonal channels 13 in the plug together form a continuous passage, which will receive steam or water from the inlet 10 and discharge the steam or water to the outlet 11 after flowing throughout said passage. By arranging diagonal channels 13 in the plug to connect the ends of alternate concentric passages 7 and produce what amounts, in effect, to a continuous spiral passage in which the steam or water always flows forward from an inlet at or about the middle to an outlet at or about the periphery of the die; and I accomplish this in a simple and comparatively inexpensive manner by connecting the ends of concentric channels through the diagonal channels 13 so that a forward flow of steam or water through a continuous passage is provided.

I find that a die constructed in accordance with my invention will heat and cool more uniformly than has been the case where the steam and water passage has been tortuous, and this is a highly desirable quality in dies for making phonograph records. My invention also provides for cooling the die from the center outward, which is also desirable to prevent the die from warping. The plug forms a support for the ends of the partitions 8 and prevents them from breaking down under the pressure of the press. There are no recesses or dead ends or corners in the passage where residue may accumulate and hence good circulation can be maintained at all times.

A matrix 14 is secured in place against the face of the die by a clamping ring 15 and the locking ring 16 or other suitable means.

My improved die can be easily manufactured by turning the concentric channel 7 therein and then cutting through the partitions to accommodate the plug 12, which is secured therein in a proper position and, after which, the back or cover plate 9 is suitably secured in place. My improved die can be made at less cost than those having a tortuous channel and the provision of concentric channels connected by diagonal channels produces a continuous passage through which the steam or water flows forward and more efficiently heats and cools the die than has been customary herebefore.

In the drawings I have illustrated a simple and effective embodiment of my invention in a phonograph record die which I have used with satisfactory results, but I appreciate the fact that it may be necessary or desirable to change the construction and arrangement of parts to adapt the die for different presses or for different purposes, and I reserve the right to make all such changes as fairly fall within the scope of the following claims.

I claim:

1. A molding die of the character described having a plurality of concentric channels and intermediate partitions, and a plug intersecting said channels and partitions and having diagonal channels therein connecting the ends of the concentric channels on one side of the plug with the other ends of said concentric channels on the other side of the plug.

2. A molding die of the character described having a plurality of concentric partitions forming channels therebetween, a plug intersecting said channels and partitions and engaging and forming a support for the ends of said partitions, said plug having diagonal channels therein connecting said concentric channels.

3. A molding die of the character described having a plurality of concentric channels and intermediate partitions, and a plug intersecting said channels and partitions and having diagonal channels therein connecting the ends of said concentric channels in staggard relation.

4. A molding die of the character described having a plurality of concentric channels and intermediate partitions, an inlet connected with the inner channel, an outlet connected with the outer channel, and a plug located between said inlet and outlet and intersecting said channels and partitions, said plug having channels therein connecting said concentric channels in staggard relation.

5. A molding die of the character described having a plurality of concentric channels and intermediate partitions, an inlet connected with the inner channel, an outlet connected with the outer channel, a plug located between said inlet and outlet and intersecting said channels and partitions, said plug forming a support for the ends of said partitions and having diagonal channels therein connecting the ends of said concentric channels in staggard relation.

JOSEPH W. BISHOP.